United States Patent [19]

Okada et al.

[11] Patent Number: 4,720,173
[45] Date of Patent: Jan. 19, 1988

[54] DISPLAY HAVING AN ORIENTATION TREATMENT BETWEEN 0° AND 15° TO THE SPACER WALL

[75] Inventors: Shinjiro Okada, Kawasaki; Junichiro Kanbe; Kazuharu Katagiri, both of Yokohama, all of Japan

[73] Assignee: Canon Kabushiki Kaisha, Tokyo, Japan

[21] Appl. No.: 706,271

[22] Filed: Feb. 27, 1985

[30] Foreign Application Priority Data

Mar. 9, 1984 [JP] Japan ................... 59-44882

[51] Int. Cl.⁴ ............................................. G02F 1/137
[52] U.S. Cl. ..................... 350/341; 350/344; 350/350 S
[58] Field of Search ............ 350/350 S, 341, 340, 350/344, 346

[56] References Cited

U.S. PATENT DOCUMENTS

| | | | |
|---|---|---|---|
| 3,563,059 | 1/1986 | Clark et al. | 350/350 S X |
| 3,964,158 | 6/1976 | Janning | 350/341 X |
| 3,978,580 | 9/1976 | Leupp et al. | 350/344 X |
| 4,291,948 | 9/1981 | Crossland et al. | 350/341 X |
| 4,362,771 | 12/1982 | Umeda et al. | 350/344 |
| 4,390,245 | 1/1983 | Shimizu et al. | 350/344 X |
| 4,561,726 | 12/1985 | Goodby et al. | 350/350 S |
| 4,586,791 | 5/1986 | Isogai et al. | 350/350 S |

FOREIGN PATENT DOCUMENTS 2102977 2/1983 United Kingdom ............ 350/344

OTHER PUBLICATIONS

Kondo et al "A Practical Method of Preparing Thin Homogeneous Ferroelectric Smectic Cells for Electro-Optical Microsecond Switches: Alignment Control of Liquid Crystal Molecules by Utilizing Spacer Edges", Jap. J. Appl. Phys., vol. 22, No. 2, Feb. 1983, pp. L85-L87.

*Primary Examiner*—Stanley D. Miller
*Assistant Examiner*—David Lewis
*Attorney, Agent, or Firm*—Fitzpatrick, Cella Harper & Scinto

[57] ABSTRACT

An optical modulation device comprises a pair of base plates and a ferroelectric liquid crystal sandwiched therebetween. A plurality of structural members each having side walls are arranged in the form of stripes on one of the pair of base plates. A monoaxial treatment is applied to at least one of the pair of base plates in a direction parallel with or perpendicular to the extension direction of the abovementioned plurality of structural members.

21 Claims, 5 Drawing Figures

DISPLAY HAVING AN ORIENTATION TREATMENT BETWEEN 0° AND 15° TO THE SPACER WALL

BACKGROUND OF THE INVENTION

The present invention relates to a liquid crystal device for use in a liquid crystal display device, an optical shutter array, etc., and more particularly to a liquid crystal device having improved display and driving characteristics, because of improved initial alignment or orientation of liquid crystal molecules.

Hitherto, liquid crystal display devices are well known, which comprise a group of scanning electrodes and a group of signal electrodes arranged in a matrix manner, and a liquid crystal compound is filled between the electrode groups to form a plurality of picture elements thereby to display images or information. These display devices employ a time-sharing driving method which comprises the steps of selectively applying address signals sequentially and cyclically to the group of scanning electrodes, and parallely effecting selective application of predetermined information signals to the group of signal electrodes in synchronism with address signals. However, these display devices and the driving method therefore have a serious drawback as will be described below.

Namely, the drawback is that it is difficult to obtain a high density of picture elements or a large image area. Because of relatively high response speed and low power dissipation, among prior art liquid crystals, most of liquid crystals which have been put into practice as display devices are TN (twisted nematic) type liquid crystals, as shown in "Voltage-Dependent Optical Activity of a Twisted Nematic Liquid Crystal" by M. Schadt and W. Helfrich, Applied Physics Letters Vol. 18, No. 4 (Feb. 15, 1971) pp. 127–128. In the liquid crystals of this type, molecules of nematic liquid crystal which show positive dielectric anisotropy under no application of an electric field form a structure twisted in the thickness direction of liquid crystal layers (helical structure), and molecules of these liquid crystals are aligned or oriented parallel to each other in the surfaces of both electrodes. On the other hand, nematic liquid crystals which show positive dielectric anisotropy under application of an electric field are oriented or aligned in the direction of the electric field. Thus, they can cause optical modulation. When display devices of a matrix electrode array are designed using liquid crystals of this type, a voltage higher than a threshold level required for aligning liquid crystal molecules in the direction perpendicular to electrode surfaces is applied to areas (selected points) where scanning electrodes and signal electrodes are selected at a time, whereas a voltage is not applied to areas (non-selected points) where scanning electrodes and signal electrodes are not selected and, accordingly, the liquid crystal molecules are stably aligned parallel to the electrode surfaces. When linear polarizers arranged in a cross-nicol relationship, i.e., with their polarizing axes being substantially perpendicular to each other, are arranged on the upper and lower sides of a liquid crystal cell thus formed, a light does not transmit at selected points while it transmits at non-selected points. Thus, the liquid crystal cell can function as an image device.

However, when a matrix electrode structure is constituted, a certain electric field is applied to regions where scanning electrodes are selected and signal electrodes are not selected or regions where scanning electrodes are not selected and signal electrodes are selected (which regions are so called "half-selected points"). If the difference between a voltage applied to the selected points and a voltage applied to the half-selected points is sufficiently large, and a voltage threshold level required for allowing liquid crystal molecules to be aligned or oriented perpendicular to an electric field is set to a value therebetween, the display device normally operates. However, in fact, according as the number (N) of scanning lines increases, a time (duty ratio) during which an effective electric field is applied to one selected point when a whole image area (corresponding to one frame) is scanned decreases with a ratio of 1/N. For this reason, the larger the number of scanning lines are, the smaller is the voltage difference as an effective value applied to a selected point and non-selected points when scanning is repeatedly effected. As a result, this leads to unavoidable drawbacks of lowering of image contrast or occurrence of crosstalk. These phenomena result in problems that cannot be essentially avoided, which appear when a liquid crystal not having bistability (which shows a stable state where liquid crystal molecules are oriented or aligned in a horizontal direction with respect to electrode surfaces, but are oriented in a vertical direction only when an electric field is effectively applied) is driven, i.e., repeatedly scanned, by making use of time storage effect. To overcome these drawbacks, the voltage averaging method, the two-frequency driving method, the multiple matrix method, etc., has already been proposed. However, any method is not sufficient to overcome the above-mentioned drawbacks. As a result, it is the present state that the development of large image area or high packaging density in respect to display elements is delayed because of the fact that it is difficult to sufficiently increase the number of scanning lines.

Meanwhile, turning to the field of a printer, as means for obtaining a hard copy in response to input electric signals, a Laser Beam Printer (LBP) providing electric image signals to electrophotographic charging member in the form of lights is the most excellent in view of density of a picture element and a printing speed.

However, the LBP has drawbacks as follows:

(1) It becomes large in apparatus size.

(2) It has high speed mechanically movable parts such as a polygon scanner, resulting in noise and requirement for strict mechanical precision, etc.

In order to eliminate drawbacks stated above, a liquid crystal shutter-array is proposed as a device for changing electric signals to optical signals. When picture element signals are provided with a liquid crystal shutter-array, however, more than 4000 signal generators are required, for instance, for writing picture element signals into a length of 200 mm in a ratio of 20 dots/mm. Accordingly, in order to independently feed signals to respective signal generators, lead lines for feeding electric signals are required to be provided to all the respective signal generators, and the production has become difficult.

In view of this, another attempt is made to apply one line of image signals in a time-sharing manner with signal generators divided into a plurality of lines.

With this attempt signal feeding electrodes can be common to the plurality of signal generators, thereby enabling to remarkably decrease the number of lead wires. However, if the number (N) of lines is increased while using a liquid crystal showing no bistability as usually practised, a signal "ON" time is substantially reduced to 1/N. This results in difficulties that light quantity obtained on a photoconductive member is decreased, and a crosstalk occurs.

In order to obviate the above-mentioned drawbacks of the conventional types of liquid crystal devices, Clark and Lagerwall have proposed the use of a liquid crystal device using a bistable liquid crystal (Japanese Laid-Open patent application No. 107216/1981, U.S. Pat. No. 4,367,924, etc.). As the bistable liquid crystal, a ferroelectric liquid crystal having a chiral smectic C (SmC*) phase or H (SmH*) phase is generally used. The ferroelectric liquid crystal has bistability, i.e., has two stable states comprising a first stable state and a second stable state. Accordingly, different from the conventional TN-type liquid crystal in the above-mentioned device, the liquid crystal is oriented to the first stable state in response to one electric field vector and to the second stable state in response to the other electric field vector. Further this type of liquid crystal very quickly assumes either one of the above-mentioned two stable states in reply to an electric field applied thereto and retains the state in the absence of an electric field. By utilizing these properties, essential improvements can be attained with respect to the above-mentioned difficulties involved in the conventional TN-type liquid crystal device. This point will be explained in further detail in connection with the present invention.

However, in order that an optical modulation device using the liquid crystal having bistability could show desired operation performances, the liquid crystal interposed between a pair of parallel base plates is required to be placed in such a state of molecular arrangement that the transition between the two stable states can effectively occur, as a matter different from or a precondition of the application of an electric field. With respect to, for example, a ferroelectric liquid crystal having an SmC* or SmH* phase, there must be formed a monodomain wherein the layers of the liquid crystal are perpendicular to the face of the base plate and therefore the molecular axis of the liquid crystal is almost in parallel with the base plate face. However, in the optical modulation devices using a bistable liquid crystal, an orientation state of a liquid crystal having such a monodomain structure cannot satisfactorily be formed, whereby the optical modulation device cannot actually show sufficient performances.

For example, several methods have been proposed by Clark et al to give such an orientation state, including a method of applying a magnetic field, a method of applying a shearing force and a method of disposing a plurality of parallel ridges at small intervals. These methods have not necessarily provided satisfactory results. For example, the method of applying a magnetic field requires a large size of apparatus and is not readily compatible with a thin layer cell which is generally excellent in operation performances. The method of applying a shearing force is not compatible with a method where a cell structure is first formed and then a liquid crystal is poured thereinto. On the other hand, the method of disposing parallel ridges in a cell cannot impart a stable orientation effect by itself.

SUMMARY OF THE INVENTION

A principal object of the present invention is, in view of the above mentioned circumstances, to provide an improvement in monodomain formability or initial alignment, of which an improvement has been desired, to an optical modulation device using a bistable liquid crystal, which is potentially suited for a display device with a high response speed, picture elements arranged at a high density and a large display area or an optical shutter having a high shutter speed, thereby to allow the optical modulation device to fully exhibit their excellent characteristics.

We have made a further study with the above object and formed that a monodomain structure compatible with the operation characteristics based on the bistability of a liquid crystal can be obtained by utilizing in combination an effect of a monoaxial orientation treatment such as rubbing and a structural orientation controlling effect due to stripe-form structural members having side walls and by regulating the direction of the monoaxial orientation treatment and the direction of arrangement of the structural members with a certain correlation with each other. Especially when attention is paid to the orientation characteristic of a liquid crystal during a temperature decreasing stage for causing transition from the cholesteric phase to a lower temperature phase such as a smectic phase, e.g., SmA (smectic A phase), it has been observed that a monodomain where liquid crystal molecules of, e.g., smectic A phase are aligned in one direction can be formed by causing a phase transition from a higher temperature cholesteric phase to a lower temperature smectic phase, if the phase transition is effected in the presence of a face of a base plate contacting the liquid crystal, to which face a function of orienting molecular axes of the liquid crystal preferantially in one direction has been imparted and also in the presence of structural members arranged in the form of stripes between the base plates, whereby a liquid crystal device having operation characteristics based on the bistability of the liquid crystal and a monodomain formation characteristic of the liquid crystal layer in combination is provided.

The optical modulation device according to the present invention is based on the above finding and, more specifically, comprises a pair of base plates comprising a first base plate and a second base plate disposed in parallel with each other, and a ferroelectric liquid crystal sandwiched between the pair of base plates, a plurality of structural members each having side walls being arranged in the form of stripes on the face of the first base plate contacting the liquid crystal, a monoaxial orientation treatment being applied to the face of at least one of the pair of base plates contacting the liquid crystal in a direction substantially parallel with or perpendicular to the extension direction of the plurality of structural members on the first base plate.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Liquid crystal materials to be used in the present invention are those showing ferroelectricity. More specifically, liquid crystals showing chiral smectic C phase

Especially preferred class of chiral smectic liquid crystals used in the liquid crystal device according to the present invention are those showing a cholesteric phase at a temperature higher than the temperature for giving a smectic phase. Specific examples of the chiral smectic liquid crystal are listed below:

Liquid Crystal No. 1

No. 2

No. 3

No. 4

(SmC*), H phase (SmH*), I phase (SmI*), J phase (SmJ*), K phase (SmK*), G phase (SmG*), or F phase (SmF*) are available.

Details of ferroelectric liquid crystals are described in, e.g., "LE JOURNAL DE PHYSIQUE LETTERS" 36 (L-69) 1975, "Ferroelectric Liquid Crystals"; "Applied Physics Letters" 36 (11) 1980, "Submicro Second Bistable Electrooptic Switching in Liquid Crystals"; "applied Physics" 16 (141) 1981, "Liquid Crystals", etc. In the present invention, ferroelectric liquid crystals disclosed in these publications may be used.

Examples of ferroelectric liquid crystal compounds include decyloxybenzylidene-p'-amino-2-methylbutyl cinnamate (DOBAMBC), hexyloxybenzylidene-p'-amino-2-chloropropyl cinnamate (HOBACPC), 4-o-(2-methyl)-butylresorcylidene-4'-octylaniline (MBRA 8), etc.

When a device is constituted using these materials, the device may be supported with a block of copper, etc., in which a heater is embedded in order to realize a temperature condition where the liquid crystal compounds assume a chiral smectic phase.

Figure 1:
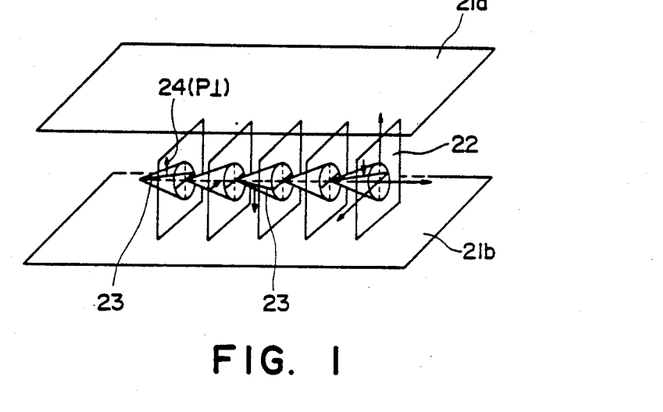
FIGS. 1 and 2 are schematic perspective views illustrating the basic operation principle of a liquid crystal cell used in the present invention.

Referring to FIG. 1, there is schematically shown an example of a ferroelectric liquid crystal cell for explanation of the operation thereof. Reference numerals 21a and 21b denote base plates (glass plates) on which a transparent electrode of, e.g., In$_2$O$_3$, SnO$_2$, ITO (Indium-Tin Oxide), etc., is disposed, respectively. A liquid crystal of an SmC*-or SmH*-phase in which liquid crystal molecular layers 22 are oriented perpendicular to surfaces of the glass plates is hermetically disposed therebetween. A full line 23 shows liquid crystal molecules. Each liquid crystal molecule 23 has a dipole moment (P⊥) 24 in a direction perpendicular to the axis thereof. When a voltage higher than a certain threshold level is applied between electrodes formed on the base plates 21a and 21b, a helical structure of the liquid crystal molecule 23 is loosened or unwound to change the alignment direction of respective liquid crystal molecules 23 so that the dipole moments (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 2:
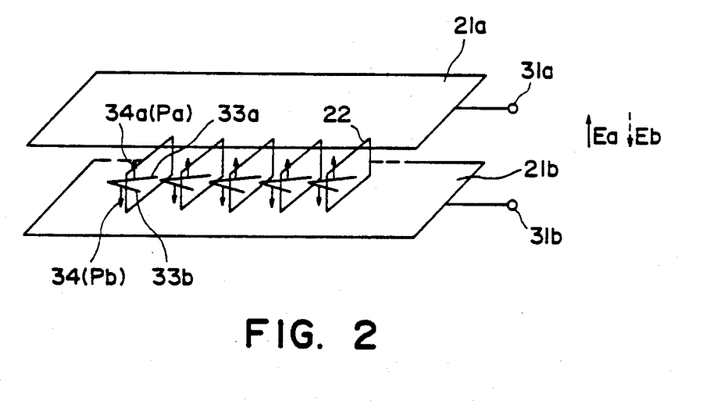

The liquid crystal layer in the liquid crystal device of the present invention may be rendered sufficiently thin in thickness (e.g., less than 10 μ). As the thickness of the liquid crystal layer is decreased, the helical structure of the liquid crystal molecules is loosened even in the absence of an electric field whereby the dipole moment assumes either of the two states, i.e., Pa in an upper direction 34a or Pb in a lower direction 34b as shown in FIG. 2. When an electric field Ea or Eb higher than a certain threshold level and different from each other in polarity as shown in FIG. 2 is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

When the above-mentioned ferroelectric liquid crystal is used as an optical modulation device, it is possible to obtain two advantages as briefly touched on hereinbefore. First is that the response speed is quite fast. Second is that the orientation of the liquid crystal shows bistability. The second advantage will be further explained, e.g., with reference to FIG. 2. When the electric field Ea is applied to the liquid crystal molecules, they are oriented in the first stable state 33a. This state is kept stable even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly kept stable even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferred that the thickness of the cell is as thin as possible.

The most serious problem encountered in forming a device using such a ferroelectric liquid crystal has been, as briefly mentioned hereinbefore, that it is difficult to form a cell having a highly uniform monodomain wherein liquid crystal layers having an SmC* or SmH* phase are aligned perpendicular to the base plate faces and the liquid crystal molecules are aligned almost in parallel with the base plate faces. A principal object of the invention is to provide a solution to this problem.

Figure 3A:
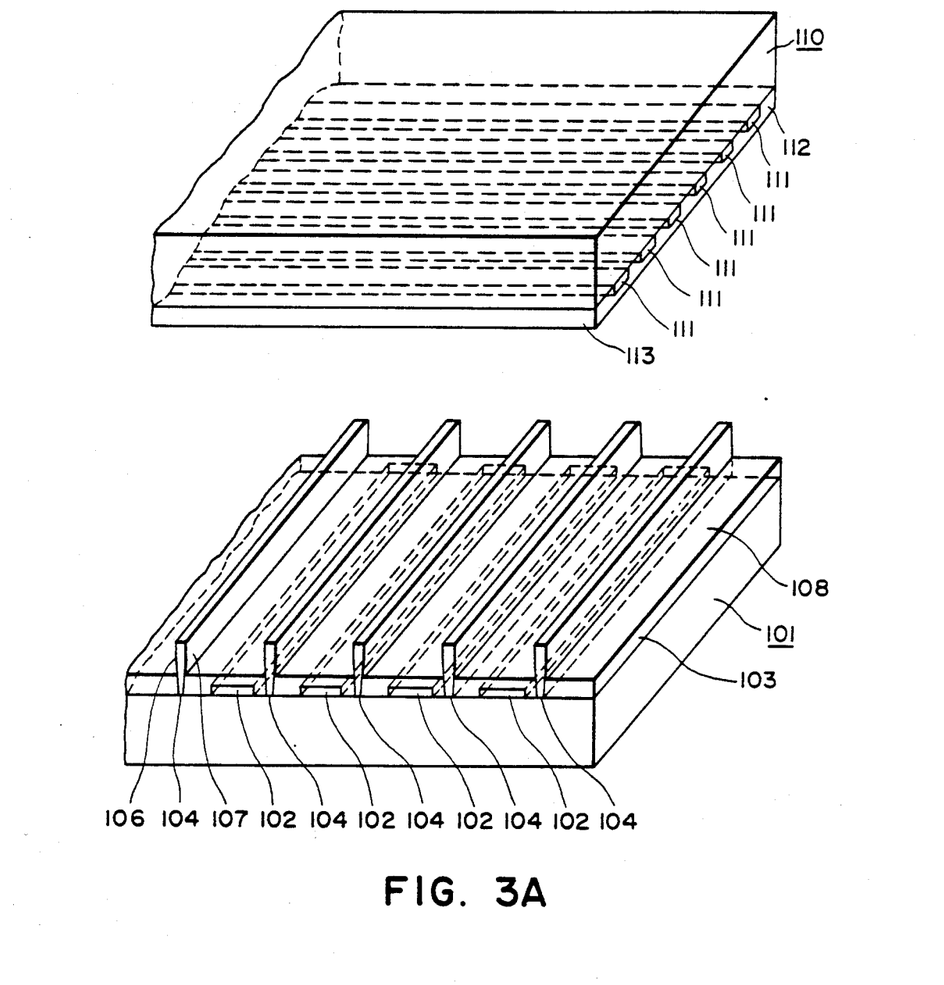
FIG. 3A is a schematic perspective view of an example of the optical modulation device according to the present invention.
Figure 3B:
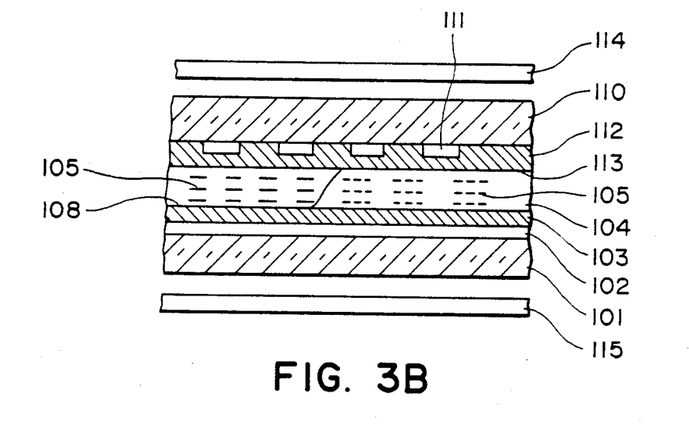
FIG. 3B is a side sectional view thereof.
Figure 3C:
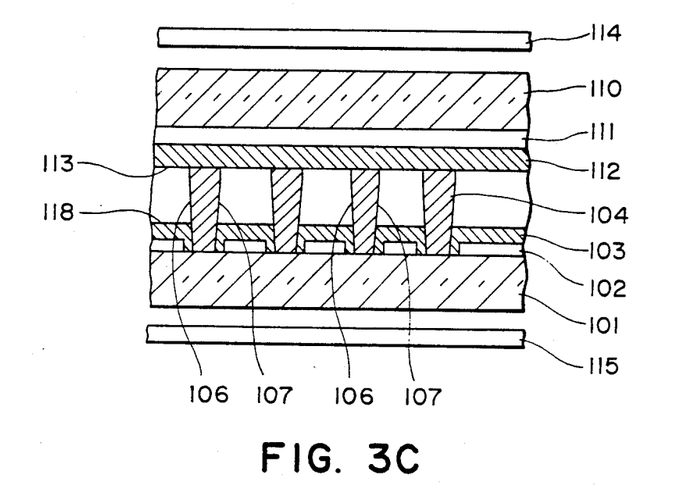
FIG. 3C is a front sectional view thereof.

FIGS. 3A to 3C illustrate an example of the optical modulation device according to the present invention. FIG. 3A is a schematic perspective view of the example wherein illustration of the liquid crystal and polarizers has been omitted for the convenience of illustration. FIG. 3B is a side sectional view of the example and FIG. 3C is a front sectional view of the example.

The example shown in FIGS. 3A to 3C, comprises a base plate 101 made of a glass plate or plastic plate, on which is formed an electrode group (e.g., a scanning electrode group) comprising a plurality of electrodes 102 formed in a predetermined pattern, e.g., by etching. Further, alternatively with and in parallel with these electrodes 102 are formed a plurality of spacer members 104 which are arranged in the form of stripes and having side walls 106 and 107.

These spacer members can have other shapes. For instance, the spacer members 104 used in this example have a reverse-trapezoid section as more clearly shown in FIG. 3C, but they can have a rectangular section.

An insulating film 103 is further formed on 101 except for the parts of the spacer members 104 to cover the electrodes 102.

The spacer members 104 may preferably be formed with a material selected from, e.g., resins such as polyvinyl alcohol, polyimide, polyamide imide, polyester imide, polyparaxylylene, polyester, polycarbonate, polyvinyl acetal, polyvinyl chloride, polyvinyl acetate, polyamides, polystyrene, cellulosic resin, melamine resin, urea resin, acrylic resin; photosensitive polyimide, photosensitive polyamide, cyclized rubber-type photoresist, phenol novolak-type photoresist; and electron beam-resists including polymethylmethanylate, epoxidized-1,4-polybutadiene, etc.).

The insulating film 103 has a function of preventing the injection of electric charge from the electrodes 102 into the liquid crystal layer. Such an insulating film may be formed by, e.g., vapor deposition of compounds such as silicon monoxide, silicon dioxide, aluminum oxide, zirconia, magnesium fluoride, cerium oxide, cerium fluoride, silicon nitride, silicon carbide, and boron nitride. Further, the insulating film 103 may be formed as a coating film of resins such as polyvinyl alcohol, polyimide, polyamide imide, polyester imide, polyparaxylylane, polyester, polycarbonate, polyvinyl acetal, polyvinyl chloride, polyvinyl acetate, polyamide, polystyrene, cellulosic resin, melamine resin, urea resin, and acrylic resin. The thickness of the insulating film 3 may be set in the range of ordinarily 50 Å to 5μ, preferably 500 Å to 5000 Å while it depends on the charge-injection prevention capacity of the material and the thickness of the liquid crystal layer. On the other hand, the thickness of the liquid crystal layer is determined by the height of the spacer members 104 depending on the readiness of orientation peculiar to the liquid crystal material and the response speed required for the device, and is set within the range of ordinarily 0.2 to 200μ, preferably 0.5 to 10μ. The width of the spacer members 104 is ordinarily set in the range of 0.5μ to 50μ, preferably in the range of 1μ to 20μ. Too large a pitch (or interval) between the spacers 104 hinders uniform orientation or alignment of the liquid crystal modecules, while too small a pitch invites decrease in effective are of the liquid crystal optical modulation device. In view of these factors, the width of the spacer members 104 is set within the range of ordinarily 10μ to 2 mm, preferably 50 to 700μ.

The spacer members 104 may be formed in a prescribed pattern and size through various techniques including various printing methods such as screen printing or more preferably, photolithography, electron beam lithography, etc.

The optical modulation of this example comprises another base plate 110 superposed above and in parallel with the base plate 101 treated in the manner as described above. On the base plate 110 have been disposed an electrode group (e.g., a signal electrode group) comprising a plurality of electrodes 111 and thereon an insulating film 112. The plurality of (signal) electrodes 111 and the other plurality of (scanning) electrodes 102 may be connected to lead wires so as to form a matrix electrode structure. The insulating film 112 has a function of preventing occurrence of a current flowing into the liquid crystal layer 105 like the above-mentioned insulating film 103 and may be formed of a similar material as the film 103.

According to the present invention, the face 113 given by the insulating film 112 on the base plate 110 has been subjected to a monoaxial orientation treatment and the orientation direction thereof is made substantially parallel with or substantially perpendicular to the extension direction of the spacer members 104, so as to give an angle $\theta$ between the two directions preferably satisfying the relationship of $0° \leq \theta < 15°$ or $80° < \theta < 100°$. According to our study, if such a parallel or perpendicular relationship is not satisfied, orientation of liquid crystal molecules is disordered at edges of the spacer members or switching between bistable states cannot satisfactorily be effected for a cell having a memory action. However, as will be understood from the above-mentioned range distortion upto 15° or so may be practically of little problem. Between the parallel and perpendicular arrangements, the parallel arrangement is rather preferred because the perpendicular arrangement has a larger tendency of causing orientation defects. Especially when the monoaxial orientation treatment is effected by rubbing which will be explained hereinbelow, the parallel arrangement gives a liquid crystal cell in which a monodomain with less orientation defects is formed.

The monoaxial orientation treatment as described above can be accomplished by rubbing the insulating film 112 with velvet, cloth or paper or by forming the insulating film by the oblique or tilt vapor deposition, as is well known with respect to TN-type liquid crystal cells.

The monoaxial orientation need not basically be conducted for the base plate 101 but may also be conducted for the base plate 101. In this case, it is preferred in order to obtain an optical modulation device with a high response speed that the effect of the monoaxial orientation treatment is selectively imparted to the side walls 106 and 107 of the spacer members by applying a monoaxial orientation treatment substantially in parallel with or perpendicular to the extension direction of the spacer members 104 and then forming the insulating film through vapor deposition or by applying a monoaxial orientation treatment to the already formed insulating film 103 and then removing the effect of the monoaxial orientation treatment selectively from a face 108 of the insulating film 103.

A pair of polarizing means, i.e., a polarizer 114 and an analyzer 115, may be disposed so as to sandwich the pair of base plates 101 and 110. The polarizer 114 and analyzer 115 may be ordinary polarizer plates or films, or polarizing beam splitters. These polarizing means may be disposed in a cross nicol relationship or parallel nicol relationship.

The optical modulation element according to the present invention can be obtained by fixing the pair of base plates in parallel with each other so that the extension direction of the spacer members and the monoaxial orientation treatment direction satisfy the above-mentioned relationship, closing the periphery of the parallel base plates with an epoxy-type adhesive, low-melting point glass, etc., to form a cell, pouring into the cell a ferroelectric liquid crystal heated to its isotropic phase, and then gradually cooling the cell under an accurate temperature control. In the course of the gradual cooling, DOBAMBC (decyloxy-benzylidene-p'-amino-2-methylbutyl cinnamate) as a typical example causes a phase transition from the isotropic phase through SmA phase to SmC* phase. In this case, in order for the liquid crystal to assume a bistable state instead of a spiral state, the thickness of the liquid crystal layer should preferably be 2 to 3 $\mu$m or below and is preferably set to a thickness of the order of 1 to 3 $\mu$m by controlling the thickness of the spacer members 104.

In the foregoing description, the present invention has been explained based on a preferred embodiment thereof. However, it would be readily understood that the above described embodiment can be modified in various manners within the scope of the present invention. For example, the structural members explained as spacer members 104 in the above example need not function as spacer members contacting both base plates as far as they have side walls having necessary wall effect acting on the liquid crystal. However, as will be understood from the description of the above embodiment, the spacer members are a preferred embodiment of the structural member having wall effect. Further, the shape of electrodes to be formed on the base plates is not restricted to stripes as described above but may be in any other form, e.g., 7-segment electrode structure. Corresponding to such modification, the spacer members 104 may assume another shape than stripes provided that they are arranged without extemely irregular intervals therebetween and can apply a substantially uniform wall effect to the liquid crystal.

Some specific examples of production of the optical modulation device according to the present invention will be explained hereinbelow.

EXAMPLE 1

On one of a pair of base plates each having stripe-form pattern electrodes of ITO (Indium-Tin-Oxide), a polyimide film was formed in a thickness of 1000° Å and rubbed in one direction. On the other base plate was formed a polyimide film in a thickness of 2 $\mu$m, which was then photoetched to leave stripe spacers of 20 $\mu$m width at a pitch of 200 $\mu$m.

The polyimide films were formed by applying an N-methylpyrrolidone solution of a polyimide precursor (SP-510 produced by Toray K.K.) by dipping or spinner coating.

The etching was carried out by immersing the base plate on which the polyimide film had been formed in an etching liquid of a 1:1 mixture of hydrazine and NaOH.

The pair of electrode plates as treated above were fixed to each other so that the extension direction of the stripe spacers and the rubbing direction were substantially in parallel with each other, thereby to form a cell having a gap of 2 $\mu$m.

Into the cell was charged DOBAMBC in isotropic phase and the cell was gradually cooled to prepare an SmC* phase liquid crystal cell. The SmC* phase liquid crystal cell was observed through a polarizing microscope, whereby a non-spiral monodomain free of orientation defects was found to be formed.

EXAMPLE 2

A zirconia film was formed on a glass base plate on which stripe pattern electrodes had been formed in the following manner. Thus, in an electron beam vapor deposition apparatus, the base plate and sintered zirconia were set and the inner pressure was reduced to below $1 \times 10^{-6}$ Torr. The sintered zirconia was melted and evaporated by irradiation of an electron beam generated under the conditions of an acceleration voltage of 10 kV and a filament current of 70 mA, whereby about 1000 Å-thick, zirconia film was formed in about 10 min.

On the zirconia film was further applied a 1% solution in buthanol of a silane coupling agent ("KBM403" produced by Shinetsu Kagaku Kogyo K.K.) by spinner coating under the conditions of 2000 rpm and 15 seconds, which was then dried under heating to form an electrode plate (A).

Separately, on a glass plate having stripe pattern electrodes thereon was applied a polyimide forming solution ("Polyimide Q" produced by Hitachi Kasei Kogyo K.K.; Nonvolatile matter content: 14.5 wt. %) by a spinner coater under the conditions of 3000 rpm and 10 seconds. The coating was heated at 120° C. for 30 min. to form a 2μ-thick polyimide film. Then, a phenolic resin base negative-type resist solution ("Raycast RD-2000N" produced by Hitachi Kasei Kogyo K.K.) was applied on the polyimide film by a spinner coater under 3000 rpm and 10 seconds, and heated at 80° C. for 20 min. to form a resist film of about 2μ in thickness. The resist film was covered with a stripe mask having a masking width of 8μ and a pitch of 100μ and exposed to light through the mask. Then the base plate was dipped in a developer solution ("RD-DEVELOPER" produced by Hitachi Kasei Kogyo K.K.) at 25° C. for 85 sec. to develop the resist, dipped in distilled water and dried at 60° C. for 5 min. Then, the base plate was dipped in a post rinse solution ("RD-POSTRINSE" produced by Hitachi Kasei Kogyo K.K.) at 23° C. for 1 min., and the resist film was peeled off with a peeling agent IndustRI-Chem Laboratory J100. Then the base plate was heated at 140° C. for 20 min., whereby spacer members were formed. According to observation through a scanning type electron microscope, the spacer members were found to have a reverse-trapezoid section.

Then, the face of the substrate with the spacer members was rubbed in the direction closely coinciding with the extension direction of the spacer members and then washed successively with water and acetone and dried. A zirconia film was formed on the rubbed face and a silane coupling agent was applied further thereon in the same manner as in the formation of the electrode plate (A), thereby to form an electrode plate (B).

The thus obtained electrode plates (A) and (B) were fixed to each other so that the rubbing direction of the former was in parallel with the extension direction of the stripe spacers of the latter, thereby to form a cell with a gap of 2 μm. DOBAMBC was heated to assume the isotropic phase and sealed in the cell. The cell was gradually cooled to provide a liquid crystal cell.

The liquid crystal cell was observed through a polarizing microscope, whereby a non-spiral monodomain free of orientation defects was found to be formed.

EXAMPLE 3

A liquid crystal cell was prepared in the same manner as in Example 2 except that the electrode plate (A) was not rubbed and only the electrode plate (B) was rubbed. The liquid crystal cell was found to have a uniform monodomain as in Example 2.

EXAMPLE 4

A liquid crystal cell was prepared in the same manner as in Example 1 except that the pair of electrode plates were fixed to each other so that the extension direction of the spacer members and the rubbing direction were perpendicular to each other.

The liquid crystal cell was observed through a polarizing microscope, whereby some orientation defects were observed in the neighborhood of the edges of spacer members.

On the other hand, another SmC* liquid crystal cell was prepared by injecting into the cell obtained in this Example the above-mentioned liquid crystal No. 1 which shows a cholesteric phase at a temperature higher than that giving the SmC* phase instead of DOBAMBC and otherwise following the manner explained in Example 1. This SmC* liquid crystal cell was observed through a polarizing microscope as in Example 1, whereby a non-spiral monodomain free of orientation defects was found to be formed.

EXAMPLE 5

An electrode plate (A) was prepared in the same manner as in Example 2 except that an SiO film having orientation effect was formed by oblique vapor deposition instead of the rubbed zirconia film. The oblique vapor deposition was conducted under the conditions of $10^{-5}$ Torr, 5 min. and an incident angle to the base plate of 20°-30°, whereby an SiO film of 1000 Å in thickness was formed. At this time, the direction of SiO deposition was caused to coincide with the extension direction of the stripe electrodes.

The thus obtained electrode plate (A) and the electrode plate (B) prepared in Example 2 were fixed to each other so that the extension direction of the stripe spacers and the direction of SiO vapor deposition were caused to coincide with each other, thereby to form a cell. DOBAMBC in the isotropic phase was charged into the cell and gradually cooled to assume the SmC* phase. The thus formed liquid crystal cell was observed in the same manner as in Example 1 and found to have an equally uniform monodomain.

EXAMPLE 6

An electrode plate (A) was prepared in the same manner as in Example 2 except that a cerium oxide film was formed as an insulating film instead of the zirconia film in the following manner. Thus, in the electron beam vapor deposition apparatus, a base plate and solid cerium oxide were set and the pressure was reduced to below $1 \times 10^{-6}$ Torr. Then, the solid cerium oxide was melted and evaporated by irradiation of an electron beam generated under the conditions of an acceleration voltage of 10 kV and a filament current of 100 mA, whereby about 1000 Å-thick cerium oxide film was formed in about 10 min.

The procedure of Example 2 was thereafter followed to form a liquid crystal device, which showed substantially the same performance as that of Example 2.

EXAMPLE 7-10

The procedure of Example 2 was repeated by replacing DOBAMBC respectively with the above described liquid crystals No. 1 (Example 7), No. 2 (Example 8), No. 3 (Example 9) and No. 4 (Example 10) to prepare liquid crystal devices, each of which was found to have a liquid crystal phase with a non-spiral monodomain.

EXAMPLE 11

On one of a pair of base plates each having stripe pattern electrodes of ITO, a polyimide film was formed in a thickness of about 1000 Å and rubbed in one direction. On the other base plate was formed a 2 μ-thick polyimide film, which was then photoetched to leave stripe spacers of 20 μm-width at a pitch of 200 μm as in Example 1. On the stripe spacers was further formed a 1000 Å-thick polyimide film in the same manner as above. The polyimide film was then rubbed in a direction parallel to the extension direction of the stripe spacers.

A pair of electrode plates thus prepared were fixed to each other so that their rubbing directions were in parallel with each other, thereby to form a cell with a gap of 2 μm.

The cell was charged with DOBAMBC in the isotropic phase and gradually cooled to prepare an SmC* phase liquid crystal cell which was found to have a similarly uniform monodomain as in Example 1.

This liquid crystal cell retained its stable monodomain free of orientation defects even after the accelerated durability test where the cell was stored at a temperature of 80° C. and a relative humidity of 90% for 500 hours and was found to have an especially stable monodomain compared with those of the previous examples.

EXAMPLE 12

A liquid crystal device was prepared in the same manner as in Example 12 by using the above-mentioned liquid crystal No. 1 instead of DOBAMBC. The liquid crystal device thus obtained showed an even better performance than that of Example 11.

Two kinds of electric signals having different polarities with each other were respectively applied to the scanning and signal electrodes, i.e., electrodes on the respective base plates, of the liquid crystal devices obtained in the above Examples 1 to 12, whereby good dynamic display based on bistability was obtained by the respective devices.

COMPARATIVE EXAMPLE 1

A non-spiral SmC* phase liquid crystal cell was prepared in the same manner as in Example 1 except that the pair of electrode plates were fixed to each other so that the extension direction of the stripe spacers and the rubbing direction were set to form an angle θ of 25°.

The thus prepared SmC* phase liquid crystal cell was observed in the same manner as in Example 1. As a result, numerous black streaks due to orientation defects were observed in the neighborhood of the edges of the stripe spacers and the black streaks covered electrodes, so that the portion of the liquid crystal forming black streaks did not show bistability when the two kinds of electric signals were applied between the pair of electrodes.

COMPARATIVE EXAMPLE 2

An electrode plate identical to the one used in Example 11 having stripe pattern electrodes covered with a rubbed polyimide film was provided.

On the other hand, an electrode plate identical to the other electrode plate used in Example 11 having stripe spacers covered with a polyimide film was provided and the polyimide film was rubbed in a direction forming an angle of 25° with respect to the extension direction of the spacer members.

The thus prepared two electrode plates were fixed to each other to form a cell so that their rubbing directions were in parallel with each other. Then, the procedure of Example 11 was followed thereafter to prepare a non-spiral SmC* phase liquid crystal. The liquid crystal was observed in the same manner as in Example 11, whereby orientation defects serious for a display device were observed similarly as Comparative Example 1. Further, when electric signals were applied between the pair of electrodes, no bistability was observed at orientation defects.

As described hereinabove, according to the present invention, stripe-form structural members having a side wall (preferably, those functioning also as spacers) are provided on one electrode plate of a pair of electrode plates, a monoaxial orientation treatment (e.g., rubbing) is applied to the other electrode plate, and the direction of the orientation treatment is controlled to be substantially parallel with or perpendicular to the above-mentioned structural members, whereby orientation defects at spacer edges can be obviated even under memory states where orientation defects are liable to be generated.

What is claimed is:

1. An optical modulating device comprising a pair of base plates comprising a first base plate and a second base plate disposed in parallel with each other, and a chiral smectic liquid crystal sandwiched between the pair of base plates; a plurality of spacer members being arranged in the form of stripes on the face of said first base plate contacting the liquid crystal, a monoaxial orientation treatment being applied to the face of the second base plate contacting the liquid crystal in a direction forming an angle θ with the extension direction of the plurality of spacer members on the first base plate, wherein $0° \leq \theta < 15\%$, said chiral smectic liquid crystal being disposed in a layer thin enough to unwind the spiral structure of the chiral smectic liquid crystal and forming monodomain formed through a cholesteric phase during a temperature decreasing stage.

2. The optical modulation device according to claim 28, wherein said monoaxial orientation treatment is rubbing treatment.

3. The optical modulation device according to claim 1, wherein said plurality of spacer members having side walls have a width within the range of 0.5μ to 50μ.

4. The optical modulation device according to claim 1, wherein said plurality of spacer members having side walls have a width within the range of 1μ to 20μ.

5. The optical modulation device according to claim 1, wherein said plurality of spacer members having side walls are arranged at a pitch of 10μ to 2 mm.

6. The optical modulation device according to claim 1, wherein said plurality of spacer members having side walls are arranged at a pitch of 50μ to 700μ.

7. The optical modulation device according to claim 1, wherein a monoaxial orientation treatment is also applied to the face of said first base plate contacting the liquid crystal in a direction forming an angle $\theta$ with the extension direction of said spacer members wherein $0° \leq \theta < 15°$.

8. The optical modulation device according to claim 1, wherein the face of said second base plate on the side contacting the liquid crystal is covered with an insulating film and a rubbing treatment is applied to the face of the insulating film contacting the liquid crystal in a direction forming an angle $\theta$ with the extension directon of said plurality of spacer members wherein $0° \leq \theta < 15°$.

9. The optical modulation device according to claim 8, wherein said insulating film is formed of at least one compound selected from the group consisting of silicon monoxide, silicon dioxide, aluminum oxide, zirconia, magnesium fluoride, cerium oxide, cerium fluoride, silicon nitride, silicon carbide, and boron nitride.

10. The optical modulation device according to claim 8, wherein said insulating film is formed of at least one resin selected from the group consisting of polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulosic resin, melamine resin, urea resin and acrylic resin.

11. The optical modulation device according to claim 8, wherein said insulating film has a thickness within the range of 50 Å to 5μ.

12. The optical modulation device according to claim 8, wherein said insulating film has a thickness within the range of 500 Å to 5000 Å.

13. The optical modulation device according to claim 1, whrein a first insulating film is provided between said plurality of spacer members and rubbed in a direction forming an angle $\theta$ with the extension direction of the spacer members, and a second insulating film is formed on the face of said second base plate on the side contacting the liquid crystal and is rubbed in a direction forming an angle $\theta$ with the extension direction of said plurality of spacer members on the first base plate wherein $0° \leq \theta < 15°$.

14. The optical modulation device according to claim 13, wherein said first and second insulating films are formed of at least one compound selected from the group consisting of silicon monoxide, silicon dioxide, aluminum oxide, zirconia, magnesium fluoride, cerium oxide, cerium fluoride, silicon nitride, silicon carbide, and boron nitride.

15. The optical modulation device according to claim 13, wherein said first and second insulating films are formed of at least one resin selected from the group consisting of polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulosic resin, melamine resin, urea resin and acrylic resin.

16. The optical modulation device according to claim 13, wherein said first and second insulating films have a thickness within the range of 50 Å to 5μ.

17. The optical modulation device according to claim 13, wherein said first and second insulating films have a thickness within the range of 500 Å to 5000 Å.

18. The optical modulation device according to claim 1, wherein said liquid crystal having a chiral smectic phase is in C phase, H phase, I phase, J phase, K phase, G phase or F phase.

19. The optical modulation device according to claim 1, wherein said first and second base plates are disposed with a gap of 1μ to 3μ therebetween.

20. The optical modulation device according to claim 1, wherein said first and second base plates are disposed with a gap of 2μ or less therebetween.

21. The optical modulation device according to claim 1, wherein said chiral smectic liquid crystal forms a monodomain formed through smectic A phase and cholesteric phase during a temperature decreasing stage.

* * * * *

UNITED STATES PATENT AND TRADEMARK OFFICE
CERTIFICATE OF CORRECTION

PATENT NO. : 4,720,173

DATED : January 19, 1988

INVENTOR(S) : SHINJIRO OKADA, ET AL.

It is certified that error appears in the above-identified patent and that said Letters Patent is hereby corrected as shown below:

AT [56] IN THE REFERENCES

U.S. Patent Documents, "3,563,059" should read --4,563,059--.

IN THE DRAWINGS:

Sheet 2, Fig. 3A, "4,720,173 FIG. 3A" should read --FIG. 3A--.

COLUMN 8

Line 18, "101" should read --base plate 101--.

COLUMN 13

Line 43, "Example 12" should read --Example 11--.

COLUMN 14

Line 52, "monodomain" should read --a monodomain--.
Lines 54-55, "clam 28," should read --claim 1,--.
Line 59, "50µ:" should read --50µ.--.

UNITED STATES PATENT AND TRADEMARK OFFICE
CERTIFICATE OF CORRECTION

PATENT NO. : 4,720,173

DATED : January 19, 1988

INVENTOR(S) : SHINJIRO OKADA, ET AL.

It is certified that error appears in the above-identified patent and that said Letters Patent is hereby corrected as shown below:

COLUMN 15

Line 5, "said spacer" should read --said plurality of spacer--.

Line 36, "whrein" should read --wherein--.

Signed and Sealed this

Second Day of August, 1988

Attest:

DONALD J. QUIGG

Attesting Officer

Commissioner of Patents and Trademarks